(12) United States Patent
Iyoki et al.

(10) Patent No.: US 7,614,288 B2
(45) Date of Patent: Nov. 10, 2009

(54) SCANNING PROBE MICROSCOPE FINE-MOVEMENT MECHANISM AND SCANNING PROBE MICROSCOPE USING SAME

(75) Inventors: Masato Iyoki, Chiba (JP); Masatsugu Shigeno, Chiba (JP)

(73) Assignee: SII Nano Technology Inc., Chiba (JP)

( * ) Notice: Subject to any disclaimer, the term of this patent is extended or adjusted under 35 U.S.C. 154(b) by 128 days.

(21) Appl. No.: 11/842,735

(22) Filed: Aug. 21, 2007

(65) Prior Publication Data
US 2008/0061232 A1 Mar. 13, 2008

Related U.S. Application Data

(63) Continuation of application No. PCT/JP2006/302316, filed on Feb. 10, 2006.

(30) Foreign Application Priority Data
Feb. 24, 2005 (JP) ............................. 2005-048262

(51) Int. Cl.
*G01B 5/28* (2006.01)
(52) U.S. Cl. .................................................... 73/105
(58) Field of Classification Search ................. 250/306; 73/105
See application file for complete search history.

(56) References Cited

U.S. PATENT DOCUMENTS 5,808,302 A * 9/1998 Binnig et al. ............... 250/306
6,127,681 A * 10/2000 Sato et al. .................. 250/306
6,229,607 B1 5/2001 Shirai et al.
6,246,652 B1 * 6/2001 Kikukawa et al. ......... 369/53.38
6,928,863 B2 * 8/2005 Massie ......................... 73/105

FOREIGN PATENT DOCUMENTS

| JP | 08-285865 | 11/1996 |
|---|---|---|
| JP | 09-033543 | 2/1997 |
| JP | 10-090610 | 4/1998 |
| JP | 11-133040 | 5/1999 |
| JP | 2000-346784 | 12/2000 |
| JP | 2004-257849 | 9/2004 |

OTHER PUBLICATIONS

International Search Report for PCT/JP2006/302316 dated 2006.

* cited by examiner

*Primary Examiner*—Kiet T Nguyen
(74) *Attorney, Agent, or Firm*—Brinks Hofer Gilson & Lione

(57) ABSTRACT

An inching mechanism for a scanning probe microscope capable of performing measurement with high precision while enhancing the scanning speed by a probe furthermore, and a scanning probe microscope comprising it. The inching mechanism for a scanning probe microscope which is provided in a scanning probe microscope (SPM) (1) having a stage (16) for mounting a sample S, and a probe (20) approaching closely to or touching the surface of the sample S, characterized in that the inching mechanism comprises a first drive section and a second drive section provided independently, a probe inching mechanism (26) having the first drive section and inching, by the first drive section, the probe (20) in the X direction and Y direction parallel with the surface of the sample S and intersecting each other, and a stage inching mechanism (27) having the second drive section and inching, by the second drive section, the stage (16) in the Z direction perpendicular to the surface of the sample S.

20 Claims, 7 Drawing Sheets

FIG 1-a
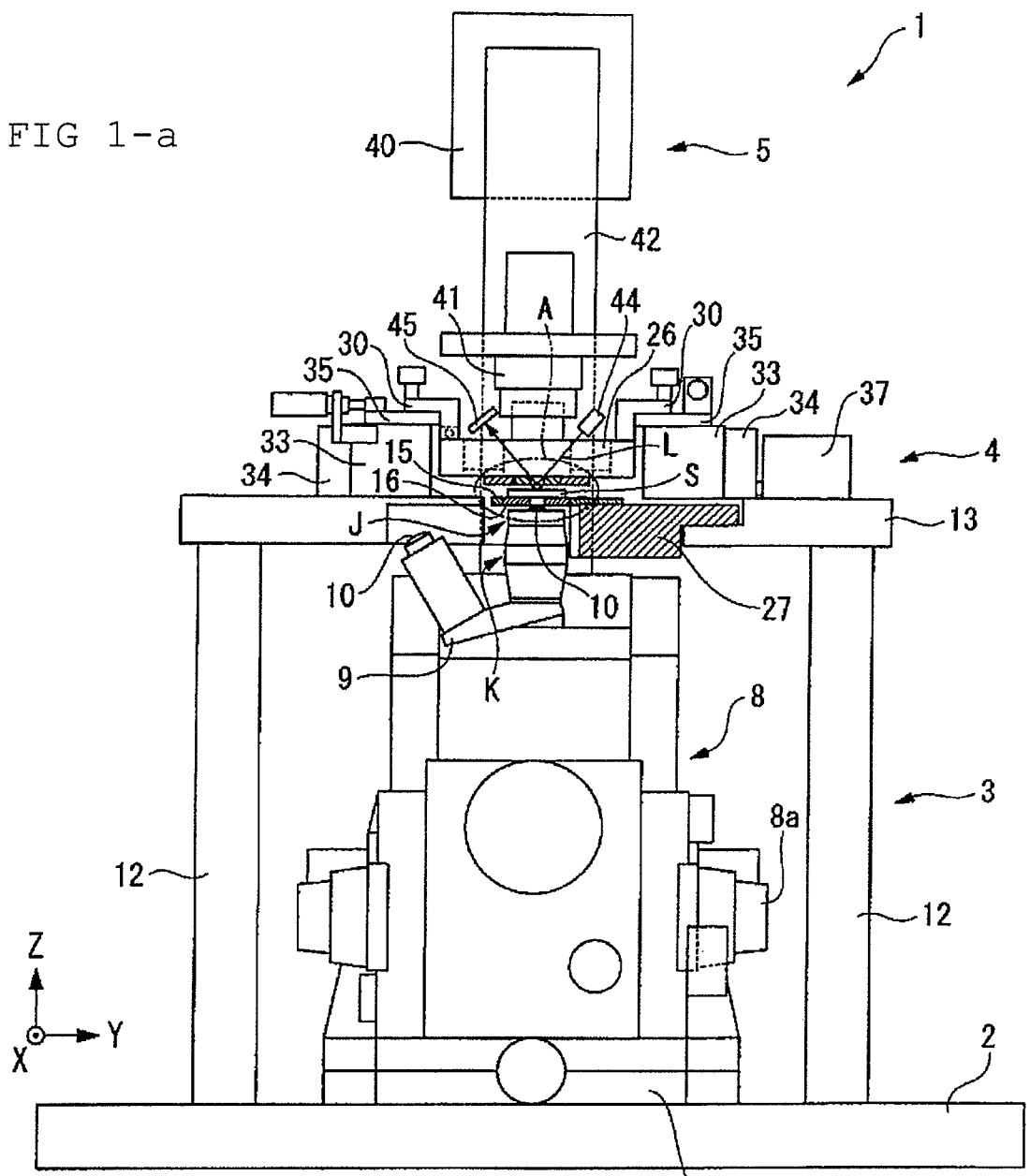
FIG 1-b
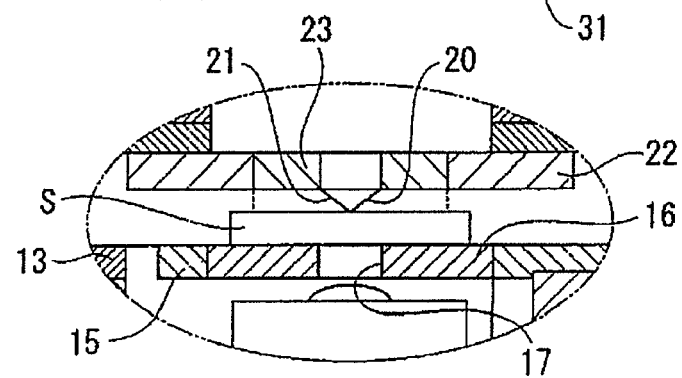

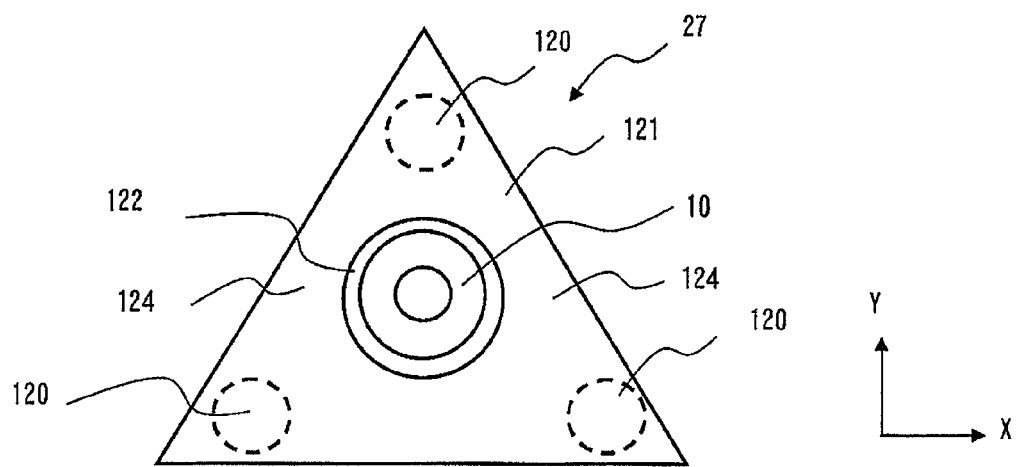
FIG 7-a
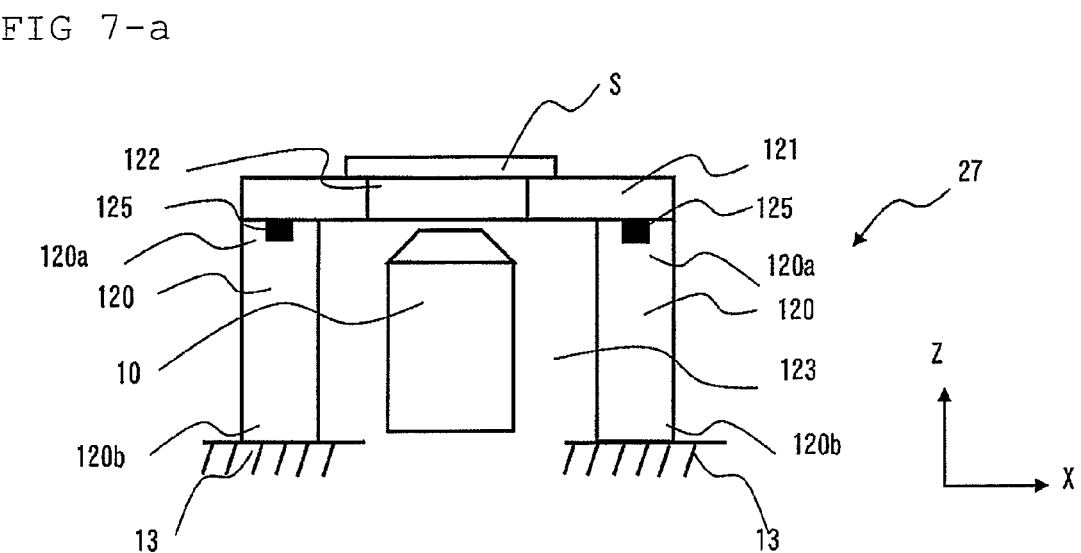
FIG 7-b

SCANNING PROBE MICROSCOPE FINE-MOVEMENT MECHANISM AND SCANNING PROBE MICROSCOPE USING SAME

This application is a continuation of PCT/JP2006/302316, filed Feb. 10, 2006, which claims priority to Japanese Application No. JP2005-048262 filed Feb. 24, 2005. The entire contents of these applications are incorporated herein by reference.

BACKGROUND OF THE INVENTION

1. Field of the Invention

The present invention relates to a scanning probe microscope fine-movement mechanism to be provided on a scanning probe microscope that measures various pieces of physical-property information about sample surface topography, viscoelasticity or the like by placing the probe in proximity to or in contact with a sample surface, and to a scanning probe microscope having the same.

2. Description of the Related Arts

As well known, the scanning probe microscope (SPM) is known as an apparatus for measuring a microscopic region of a sample, such as of metal, semiconductor, ceramic, resin, polymer, bio material or insulator, and observing the sample for its physical-property information of viscoelasticity, etc. or surface topography.

Of the scanning probe microscopes, there is well known a type having a stage to put a sample thereon and a cantilever having a probe at a front end to be placed in proximity to or in contact with a sample surface (see JP-A-2000-346784, for example). The stage and the probe are to be relatively moved in X and Y directions so that the sample can be scanned over by the probe. While measuring a displacement amount of the cantilever during the scanning, the stage or the probe is operated in the Z direction. By controlling the distance of between the sample and the probe, measurement can be made as to various pieces of physical-property information.

In the meanwhile, in order to improve measurement accuracy, there is a need to move the stage and the probe with accuracy for scanning. For this reason, it is a general practice to provide a scanning probe microscope fine-movement mechanism in order to move the stage and the probe with accuracy.

The scanning probe microscope fine-movement mechanism has a driver, such as a three-dimensional actuator, for finely moving the stage and the probe, wherein there is well known a type that movements in X, Y and Z directions are available by means of such a three-dimensional actuator.

Here, in order to improve the scanning speed with a probe, movement speed is needed by far higher in the Z direction as compared to that in the X or Y direction. This is because follow-up is always needed in the Z direction in order to bring the distance of between the sample and the probe into constant during scanning in the X and Y directions.

SUMMARY OF THE INVENTION

However, in the structure using a three-dimensional actuator like the above, movement must be made not only in the Z direction but also in the X and Y directions by means of the three-dimensional actuator. The three-dimensional actuator itself is increased in size, which in turn decreases the resonant frequency of the three-dimensional actuator. Thus, there is problematically a difficulty in raising vibration frequency in the Z direction. Meanwhile, movement is simultaneously made in the X, Y and Z directions by means of the three-dimensional actuator, thus having effect one upon another and lowering the accuracy of movement.

The present invention, made in view of such a circumstance, aims at providing a scanning probe microscope fine-movement mechanism which allows for conducting a measurement with accuracy while further improving the scanning speed with the probe, and a scanning probe microscope including same.

The present invention provides the following means in order to solve the foregoing problem.

The present invention is a scanning probe microscope fine-movement mechanism provided on a scanning probe microscope having a stage on which a sample is put and a probe to be placed in proximity to or in contact with a surface of the sample put on the stage, the fine-movement mechanism comprising: first and second drivers provided independently of each other; a probe fine-movement mechanism having the first driver and for finely moving the probe in X and Y directions parallel with a surface of the sample and transverse to each other by means of the first driver; and a stage fine-movement mechanism having the second driver and for finely moving the stage in a Z direction vertical to the surface of the sample by means of the second driver.

In the scanning probe microscope fine-movement mechanism according to the invention, the probe is to be finely moved in X and Y directions by means of the first driver provided in the probe fine-movement mechanism. Meanwhile, the stage is to be finely moved in a Z direction by means of the second driver provided in the stage fine-movement mechanism. In this case, the first and second drivers are driven independently separately from each other.

Due to this, the first and second drivers can be separated and reduced in size, thereby raising the resonant frequency and preventing the first and second drivers from having effect upon each other.

Meanwhile, in the scanning probe microscope fine-movement mechanism, the probe fine-movement mechanism has probe displacement detecting means that detects a displacement of the probe.

In the scanning probe microscope fine-movement mechanism according to the invention, the probe displacement detecting means is to detect a displacement of the probe.

Due to this, the displacement amount of the probe can be measured positively while finely moving the probe.

Meanwhile, in the scanning probe microscope fine-movement mechanism, the probe fine-movement mechanism has a probe-side through-hole directed in the Z direction.

Furthermore, in the scanning probe microscope fine-movement mechanism, illumination light is to be passed through the probe-side through-hole.

In the scanning probe microscope fine-movement mechanism according to the invention, a probe-side through-hole is provided in the probe fine-movement mechanism, to pass illumination light through the probe-side through-hole.

Due to this, an illumination device can be easily provided in the scanning probe microscope without obstructing the illumination light by the probe fine-movement mechanism.

Meanwhile, in the scanning probe microscope fine-movement mechanism, the stage fine-movement mechanism has a stage-side through-hole directed in the Z direction.

Furthermore, in the scanning probe microscope fine-movement mechanism, illumination light is to be passed through the stage-side through-hole.

In the scanning probe microscope fine-movement mechanism according to the invention, a stage-side through-hole is provided in the stage fine-movement mechanism, to pass illumination light through the stage-side through-hole.

Due to this, an illumination device can be easily provided in the scanning probe microscope without obstructing the illumination light by the stage fine-movement mechanism.

In the scanning probe microscope fine-movement mechanism, an objective lens is provided in a position where the probe or the cantilever provided with the probe is to be observed through the probe-side through-hole.

In the scanning probe microscope fine-movement mechanism according to the invention, an objective lens is provided in a position where the probe or the cantilever is to be observed through the probe-side through-hole.

Due to this, the objective lens can be moved further closer to the probe or the sample without obstructing the objective lens by the probe fine-movement mechanism, thus making it possible to provide an objective lens having high NA.

Meanwhile, in the scanning probe microscope fine-movement mechanism, an objective lens is provided in a position where the sample is to be observed through the stage-side through-hole.

In the scanning probe microscope fine-movement mechanism according to the invention, an objective lens is provided in a position where the sample is to be observed through the stage-side through-hole.

Due to this, the objective lens can be moved further closer to the sample without obstructing the objective lens by the stage fine-movement mechanism, thus making it possible to provide an objective lens having high NA.

Meanwhile, in the scanning probe microscope fine-movement mechanism according to the invention, the objective lens is provided in plurality, including arrangement change means that changes an arrangement of the plurality of objective lenses.

In the scanning probe microscope fine-movement mechanism according to the invention, the arrangement change means is to change the arrangement of the plurality of objective lenses.

Due to this, a plurality of magnification types of objective lenses can be selected in accordance with various samples.

Meanwhile, in the scanning probe microscope fine-movement mechanism, the stage fine-movement mechanism has a mechanism body having the second driver and an extension that extends in a direction transverse the thickness-wise of the mechanism body and supporting the stage wherein the extension has a thickness dimension set smaller than a thickness dimension of the mechanism body.

In the scanning probe microscope fine-movement mechanism according to the invention, because the thickness dimension of the extension is set smaller than the thickness dimension of the mechanism body, the extension is opened in its thickness-wise space.

Here, in case thickness dimension is equal between the extension and the mechanism body, sufficient space is not available in providing an objective lens in a position below the extension thus making it impossible to put the objective lens closer to the sample. Accordingly, it can be considered to provide a recess in a position below the sample and arrange an objective lens in the recess. However, in case an objective lens is arranged in the recess, the objective lens is difficult to move when changed with a different magnification of another objective lens.

In the invention, space is opened in the thickness-wise of the extension. Accordingly, space can be utilized effectively at around the extension, e.g. the objective lens can be easily moved.

In the scanning probe microscope fine-movement mechanism, the mechanism body is supported cantilevered.

In the scanning probe microscope fine-movement mechanism according to the invention, because the mechanism body is supported cantilevered, space can be sufficiently opened at around the extension by a simple structure.

Meanwhile, in the scanning probe microscope fine-movement mechanism, the second driver is structured by a plurality of actuators to expand and contract in the Z direction, the actuators being joined together at movable ends thereof by means of the stage.

In the scanning probe microscope fine-movement mechanism according to the invention, because the stage is supported by the plurality of actuators, the stage can be increased in rigidity and moved at high speed in the Z direction. Meanwhile, an objective lens can be arranged in the space surrounded by the plurality of actuators or illumination light can be irradiated to the sample through the space region. Meanwhile, the objective lens can be exchanged by objective-lens arrangement change means through between adjacent ones of the actuators.

Meanwhile, in the scanning probe microscope fine-movement mechanism, the second driver has a cylindrical piezoelectric element.

In the scanning probe microscope fine-movement mechanism according to the invention, the stage can be moved accurately by the cylindrical piezoelectric element. Meanwhile, a cylinder hollow region enables light illumination and object lens arrangement.

Meanwhile, in the scanning probe microscope fine-movement mechanism, the first driver has a cylindrical piezoelectric element.

In the scanning probe microscope fine-movement mechanism according to the invention, the probe can be finely moved accurately by the cylindrical piezoelectric element. Meanwhile, a cylinder hollow region enables light illumination and object lens arrangement.

Meanwhile, in the scanning probe microscope fine-movement mechanism, the probe fine-movement mechanism includes a plurality of frames coupled concentric to and in flush with each other through the first driver.

In the scanning probe microscope fine-movement mechanism according to the invention, the probe is finely moved by the drive of the first driver through the frames. Because the frames are coupled concentric to and in flush with each other, the probe fine-movement mechanism can be reduced in size with a reduced thickness. Accordingly, an objective lens having higher NA can be arranged.

Meanwhile, in the scanning probe microscope fine-movement mechanism, there is included fine-movement amount detecting means that detects at least one of an X-directional fine movement amount of the probe, a Y-directional fine movement amount of the probe and a Z-directional fine movement amount of the stage or calculating means that calculates an error of fine movement amount in at least one of X direction, Y direction and Z direction, depending upon a detection result from the fine-movement amount detecting means.

In the scanning probe microscope fine-movement mechanism according to the invention, the fine-movement amount detecting means is to detect at least one of an X-directional fine movement amount of the probe, a Y-directional fine movement amount of the probe and a Z-directional fine movement amount of the stage. Meanwhile, the calculating means is to calculate an error of fine movement amount in at least one of X direction, Y direction and Z direction, depending upon a detection result from the fine-movement amount detecting means.

Due to this, it is possible to obtain information about an error in fine movement amount resulting from hysteresis or creep of the piezoelectric elements for example. When installed on a scanning probe microscope, the measurement result of the scanning probe microscope can be easily corrected depending upon the information.

Meanwhile, a scanning probe microscope includes a scanning probe microscope fine-movement mechanism according to the foregoing.

The scanning probe microscope according to the invention can exhibit an effect similar to the foregoing scanning probe microscope fine-movement mechanism.

According to the invention, the first and second drivers can be prevented from having effects upon each other besides the first and second drivers can be raised in their resonant frequencies. Measurement accuracy can be improved while improving the probe scanning speed furthermore.

Meanwhile, because illumination light can be irradiated vertically of the first and second drivers or a high-NA objective lens can be arranged exchangeable, a high-magnification optical microscope and a scanning probe microscope can be easily combined together.

BRIEF DESCRIPTION OF THE DRAWINGS

FIG. 1 is a figure showing a first embodiment of a scanning probe microscope according to the invention wherein FIG. 1-a is a front view of the scanning probe microscope while FIG. 1-b is a magnified view of the region designated by reference A in FIG. 1-a.

FIG. 7-a is a plan view and FIG. 7-b is a front view of another modification of the stage fine-movement mechanism.

DESCRIPTION OF THE PREFERRED EMBODIMENTS

Embodiment 1

Figure 2:
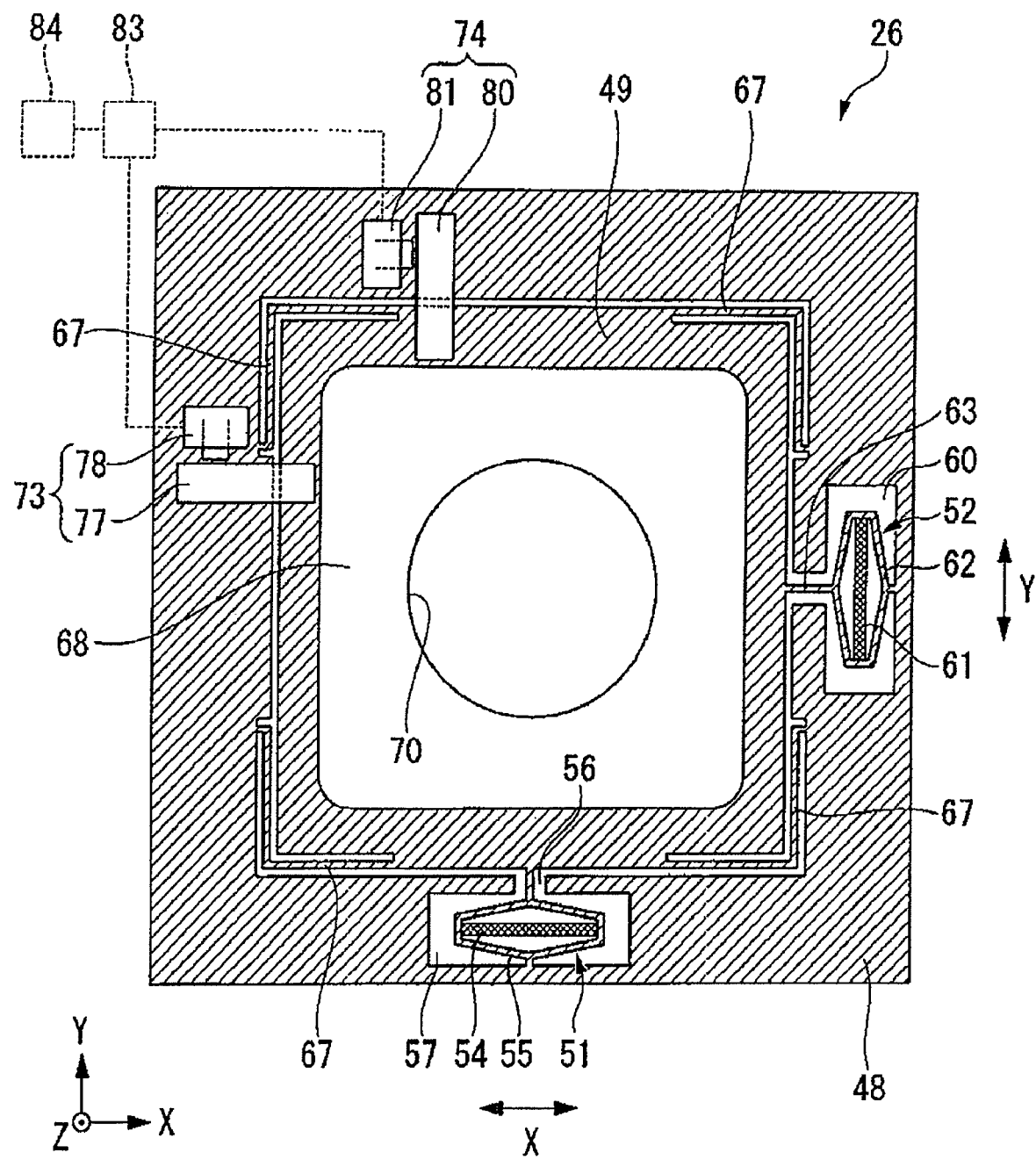
FIG. 2 is a magnified plan view showing the probe fine-movement mechanism shown in FIG. 1-a.

With reference to the drawings, explanation will be made in the below on a scanning probe microscope according to a first embodiment of the present invention. In the present embodiment, in-liquid measurement is assumed to be performed in a DFM (dynamic force mode) that scanning is made by placing the cantilever, vibrating at around the resonant frequency, in proximity to a sample while keeping constant the distance between the probe and the sample in accordance with the change amount of amplitude and phase.

The scanning probe microscope 1, a combination with an inverted microscope, has a main body 3 set up on a anti-vibration table 2 serving as a base plate, a measurer 4 provided above the main body 3, an inverted microscope 8 provided beneath the measurer 4 and an illuminator 5 provided above the measurer 4 and continuing with the inverted microscope 8, as shown in FIG. 1-a and 1-b.

The inverted microscope 8 is set up on the anti-vibration table 2 through an XY stage 31.

The main body 3 is structured with a plate-like base 13 supported by the columns 12 extending vertically from the anti-vibration table 2. A base opening 15 is formed in the center of the base 15. In the base opening 15, a stage 16 is provided to rest a sample S thereon. A stage opening 17 is formed in the center of the stage 16. The stage 16 is to finely move in the Z direction by means of a stage fine-movement mechanism 27, referred later. Incidentally, Z direction is in a direction vertical to a surface of a sample S and to the stage 16, referring to a height direction of the scanning probe microscope 1.

The measurer 4 is arranged on the upper surface of the stage 16. The measurer 4 has a probe fine-movement mechanism 26 so that the probe fine-movement mechanism 26 is provided with a crank mount 30 made in a crank By means of the crank mount 30, the probe fine-movement mechanism 26 is arranged coincident at the center thereof with the stage opening 17.

Incidentally, the probe fine-movement mechanism 26 and the stage fine-movement mechanism 27 constitute a fine-movement mechanism for the scanning probe microscope.

On the lower surface of the probe fine-movement mechanism 26, a cantilever holder 22 is provided to support a cantilever 20. The cantilever holder 22 is provided with a glass-make glass holder 23 at the center thereof. The glass holder 23 is to prevent the irregular reflection, etc. of illumination light during in-liquid measurement by forming a liquid viscous film at between the sample S and the glass holder 23.

Incidentally, the cantilever 20 is not limited to the elongate form but the invention includes a bent probe, for a near-field optical microscope, having an optical fiber triangular as viewed from above or circular in section that is sharpened and bent at the front end.

The cantilever 20 is provided above the stage opening 17. The cantilever 20 has a front end provided with a sharpened probe 21 and a rear end fixed to the cantilever holder 22. Due to this, the cantilever 20 is supported at its one end such that the front end, where the probe 21 is provided, serves as a free end. Meanwhile, the cantilever 20 is to be vibrated at a predetermined frequency and amplitude along the Z direction by means of vibration means, not shown, and further to be finely moved in XY directions relative to the stage 16 by means of the probe fine-movement mechanism 26. Incidentally, the XY directions refer to mutually-orthogonal directions that are parallel with the surface of the sample S and the stage 16, which are orthogonal to the Z direction. Furthermore, the X direction refers to a widthwise direction of the scanning probe microscope 1 while the Y direction refers to a depthwise direction of the scanning probe microscope 1.

Meanwhile, in the vicinity of the probe fine-movement mechanism 26, a Z rough-movement mechanism 33 is provided to roughly move the cantilever 20 in the Z direction. The Z rough-movement mechanism 33 has its base 34 fixed on the base 13 of the main body 3. On the upper surface of the Z rough-movement mechanism 33, an XY stage 35 is provided. On the upper surface of the XY stage 35, the crank mount 30 is fixed.

Meanwhile, the illuminator 5 is provided above the probe fine-movement mechanism 26. The illuminator 5 has a light source 40 for emitting illumination light and a condenser lens 41 for focusing the illumination light from the light source 40. The condenser lens 41 is arranged above the center of the probe fine-movement mechanism 26 by means of the lens support 42 continuing with the inverted microscope 8 and supported for vertical movement relative to the probe fine-movement mechanism 26.

Furthermore, the probe fine-movement mechanism 26 in this embodiment has an outer frame (frame) 48 and an inner frame (frame) 49 that are rectangular in form different in widthwise dimension as shown in FIG. 2. The outer and inner frames 48, 49 are formed flat of cast iron low in thermal expansion. Meanwhile, the outer frame 48 and the inner frame 49 are coupled concentrically with each other through an X driver (first driver) 52 and Y driver (first driver) 51. The outer frame 48 and the inner frame 49 are arranged in flush at the surfaces thereof. The X driver 52 is arranged within an X-side cavity 60 formed extending in the Y direction in the outer frame 48 while the Y driver 51 is arranged within a Y-side cavity 57 extending in the X direction similarly.

The X driver 52 has an X-side piezoelectric element 61 of a lamination type directed in the Y direction. The X-side piezoelectric element 61 is provided with an X-side displacement increasing mechanism 62, nearly rhombus as viewed from above, in a manner surrounding the periphery thereof. The X-side displacement increasing mechanism 62 is coupled to the inner frame 49 through the X-side coupling 63.

The Y driver 51 has a Y-side piezoelectric element 54 of a lamination type directed in the X direction. The Y-side piezoelectric element 54 is provided with a Y-side displacement increasing mechanism 55, nearly rhombus in plan, similarly to the above. The Y-side displacement increasing mechanism 55 is coupled to the inner frame 49 through the Y side coupling 56.

At the four corners of the inner frame 49, parallel springs 67 are arranged.

With this structure, by applying voltage to the X-side and Y-side piezoelectric element 61, 54, the X-side and Y-side displacement increasing mechanisms 62, 55 expand/contract respectively in the X and Y directions, thereby finely vibrating the inner frame 49 in the XY directions.

Meanwhile, a generally rectangular base plate 68 is provided on a bottom surface of the inner frame 49. In the center of the base plate 68, a probe-side through hole 70 is formed directed in the Z direction. The illumination light, from the light source 40 shown in FIG. 1, is to be passed through the probe-side through-hole 70.

Incidentally, the cantilever 20 is provided on the lower surface of the base plate 68 through the cantilever holder 22 as mentioned before. By finely vibrating the inner frame 49 in the XY directions, the cantilever 20 is finely vibrated in the XY directions together with the base plate 68 and cantilever holder 22.

Meanwhile, a Y-directional fine-movement detector 73 and an X-directional fine-movement detector 74 are provided on the upper surface of the outer and inner frame 48, 49. The Y-directional fine-movement detector 73 has a Y-directional target 77 fixed on the inner frame 49 and extending in the X direction and a Y-directional sensor 78 fixed on the outer frame 48 and for detecting a Y-directional movement amount of the Y-directional target 77. Meanwhile, the X-directional fine-movement detector 74 similarly has an X-directional target 80 extending similarly in the Y direction and an X-directional sensor 81 for detecting a Y-directional movement amount of the X-directional target 80. The Y-directional sensor 78 and the X-directional sensor 81 use capacitance-type sensors. However, this is not limitative but a strain gauge, an optical displacement measurement system or a differential transformer is applicable.

With this structure, when the inner frame 49 finely moves in the X direction, the X-directional target 80 also moves slightly in the X direction so that the X-directional fine movement can be detected by the X-directional sensor 81. Meanwhile, when the inner frame 49 finely moves in the Y direction, the Y-directional target 77 also moves slightly in the Y direction so that the Y-directional fine movement can be detected by the Y-directional sensor 78. Namely, the X-directional sensor 81 is to detect an X-directional fine movement of the cantilever 20 through the X-directional target 80 and inner frame 49 while the Y-directional sensor 78 is to detect a Y-directional fine movement of the cantilever 20 through the Y-directional target 77 and inner frame 49, thus functioning as slight-amount detecting means.

The X-directional sensor 81 and the Y-directional sensor 78 are both electrically connected to an arithmetic operator section (calculating means) 83 so that a detection result, from the X-directional and Y-directional sensors 81, 78, can be inputted to the arithmetic operator section 83. In accordance with the detection result, the arithmetic operator section 83 is to calculate an XY-directional fine movement amount error of the cantilever 20 depending upon an application voltage and fine-movement amount. Namely, the arithmetic operator section 83 is to function as calculating means. Furthermore, the arithmetic operator section 83 is electrically connected to a control section 84 that takes various types of control, to input a calculation result to the control section 84. The control section 84 controls the probe fine-movement mechanism 27 to linearly operate in response to the application voltage.

Meanwhile, the probe fine-movement mechanism 26 is provided with a laser light source (probe displacement detecting means) 44 for emitting laser light and a photodetector (probe displacement detecting means) 45 for receiving the laser light from the laser light source 44 and split, say, into four equal parts as shown in FIG. 1. The laser light source 44 and the photodetector 45 are arranged opposite to each other, in positions obliquely above the cantilever 20. The laser light, emitted from the laser light source 44, is to reach and reflect upon an upper surface of the cantilever 20, the reflection light of which is to arrive at the photodetector 45.

Figure 3:
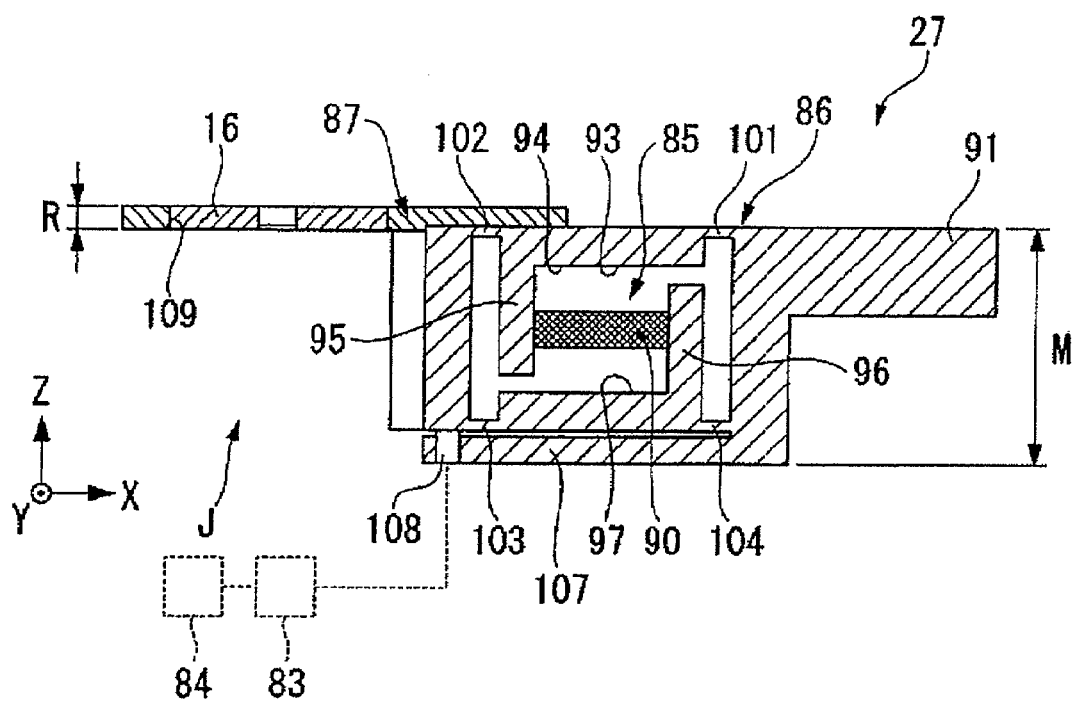
FIG. 3 is a magnified plan view showing the stage fine-movement mechanism shown in FIG. 1-a.
Figure 4:
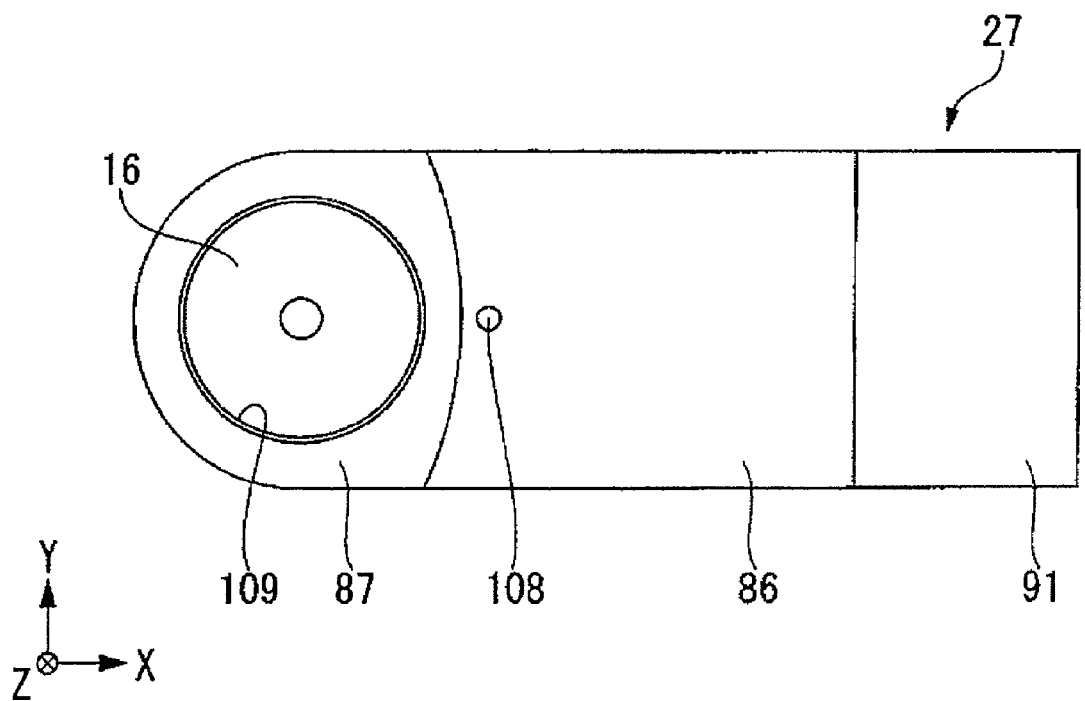
FIG. 4 is a bottom view showing the stage fine-movement mechanism shown in FIG. 3.

Furthermore, the stage fine-movement mechanism 27 in this embodiment has a mechanism body 86 formed in a nearly rectangular form and an extension 87 extending in a direction (i.e. in the X direction) transverse to the thickness-wise (i.e. Z direction) of the mechanism body 86, as shown in FIGS. 3 and 4.

The extension 87 has a thickness dimension R established smaller than the thickness dimension M of the mechanism body. The upper surface of the extension 87 is nearly in flush with the upper surface of the mechanism body 86, thereby providing a space J below the extension 87.

In the extension 87, a stage-side through-hole 109 is formed directed in the Z direction. The foregoing stage 16 is placed in the stage-side through-hole 109.

The mechanism body 86 is provided with a body mount 91 extending in a direction opposite to the extension 87. The body mount 91 is fixed on a predetermined position of the base 13 shown in FIG. 1, thereby cantilever-supporting the mechanism body 86.

Meanwhile, a cavity 93 is provided in the mechanism body 86. A first parallel spring 101 is provided at one of the X-directional ends of an upper inner wall 94 of the cavity 93 closer to the provision of the body mount 91 while a second parallel spring 102 is provided at the other end closer to the provision of the extension 87. Meanwhile, a third parallel spring 103 is provided at one of the X-directional ends of a lower inner wall 97 closer to the extension 87 while a fourth parallel spring 104 is provided at the other end closer to the provision of the body mount 91. In the vicinity of the second parallel spring 102, a downward wall 95 is provided extending lower from the upper inner wall 94. In the vicinity of the fourth parallel spring 104, an upward wall 96 is provided extending upper from the lower inner wall 97. Namely, the downward wall 95 and the upward wall 96 are oppositely arranged extending in opposite directions to each other.

A Z driver (second driver) 85 is provided between the downward wall 95 and the upward wall 96. The Z driver 85 is provided physically separate from the X and Y drivers 52, 51 so that those are to function independently. The Z driver 85 is made by a Z-side piezoelectric element 90 of a lamination type directed in the X direction. The Z-side piezoelectric element 90 has one end fixed to the downward wall 95 and the other end fixed to the upward wall 96. Furthermore, in the lower end of the mechanism body 86, a bottom wall 107 is provided extending in the X direction. The bottom wall 107 has X-directional both ends, one end of which closer to the provision of the body mount 91 is integrally fixed with the side wall of the mechanism body 86 while the other end closer to the provision of the extension 87 is made as a free end. The bottom wall 107 has a front end provided with a Z-direction fine-movement detector 108 connected to the arithmetic operator section 83. The Z-direction fine-movement detector 108 uses an electrostatic sensor. However, this is not limitative but a strain gauge, an optical displacement measurement system or a differential transformer is applicable.

With this structure, if voltage is applied to the Z-side piezoelectric element 90, the Z-side piezoelectric element 90 expands and contracts. When the Z-side piezoelectric element 90 expands, the downward and upward walls 95, 96 are depressed outward with respect to the X direction. The upward wall 96 rotates clockwise in FIG. 3 about the fixed end and the around while the downward wall 95 rotates clockwise about the fixed end and the around with a result that the extension 87 is moved in the Z direction while being guided by the first to fourth parallel springs 101, 102, 103, 104. Thus, the stage 16 coupled to the extension 87 is moved in the Z direction. On this occasion, the Z-directional fine-movement detector 108 detects the amount of a fine movement of the mechanism body 86. Namely, the Z-directional fine-movement detector 108 functions as fine-movement amount detecting means to detect the amount of a Z-directional fine movement of the stage 16 through the mechanism body 86. Depending upon the detection result of the Z-directional fine-movement detector 108, the arithmetic operator section 83 calculates an error in the Z-directional fine movement amount of the stage 16 by use of the application voltage and actual fine movement amount. The calculation result is inputted to the control section 84 so that the control section 84 can control the stage fine-movement mechanism 27 to linearly operate in response to the application voltage.

Incidentally, in the Z direction, the fine movement amount may be detected merely by the Z-direction fine-movement detector 108 and displayed as the height information due to the scanning probe microscope.

The stage fine-movement mechanism 27 thus structured is small in size and high in rigidity, which is higher in resonant frequency as compared to the probe fine-movement mechanism 26 thus being allowed to operate at high speed.

Furthermore, in this embodiment, an objective lens 10 is provided in the space J as shown in FIG. 1. Namely, a revolver (arrangement change means) 9 is provided at an upper end of the inverted microscope 8. A plurality of objective lenses 10 different in magnification are provided on the revolver 9. By rotating the revolver 9, the plurality of objective lenses 10 can be changed in their arrangements. The plurality of objective lenses 10 can be selectively arranged in an observation site K in the space J. The observation site K refers to a position where is below the stage 16 and coincident with the stage opening 17, i.e. a position where a sample S is to be observed.

The objective lenses 10 are to be moved vertically in the Z direction by operating a focusing dial 8a provided on the inverted microscope 8 at the observation site K.

Now explanation is made on the function of the scanning probe microscope 1 in the present embodiment thus constructed.

At first, a sample S is put on the stage 16 through an in-liquid cell, not shown. Then, the light source 40 is put on, to irradiate illumination light to the sample S. Thereupon, the illumination light passes through the probe-side through-hole 70. Transmitting through the sample S, the light further passes through the stage-side through-hole 109, to reach the objective lens 10 arranged in the observation site K. Due to this, the state of the sample S can be observed through the objective lens 10. In this case, when the revolver 9 is rotated, the first objective lens 10 goes out of the observation site K through the space J, to place another objective lens 10 in the observation site K. This allows for selecting a suitable magnification of objective lens 10. When the focusing dial 8a is operated, the objective lens 10 moves up. The objective lens 10 moves toward the sample S into focusing.

Due to this, initial observation is made on the sample S. In accordance with the result, measurement is conducted in greater detail.

For conducting a detailed measurement, alignment is made with the XY stage 35 while viewing the image of a sample S surface and probe 21 position through the inverted microscope 8. Then, positional adjustment is made as to the laser light source 44 and the photodetector 45. Namely, positional adjustment is made to reflect the laser light L, emitted from the laser light source 44, upon the upper surface of the cantilever 20 positively into the photodetector 45. Then, driving the motor 37, the cantilever 20 is roughly moved by the Z rough-movement mechanism 33, to submerge the cantilever 20 in an in-liquid-cell culture solution. Then, the probe 21 is put in proximity to the surface of the sample S.

In this state, the probe 21 is vibrated in the Z direction at a predetermined frequency and amplitude by the vibrating means through the cantilever 20. Then, voltage is applied to the X-side and Y-side piezoelectric elements 61, 54 shown in FIG. 2. Thereupon, the X-side and Y-side piezoelectric elements 61, 54 expand and contract, to finely move the inner frame 49 through the X-side and Y-side displacement increasing mechanisms 62, 55. Due to this, the probe 21 performs a raster scanning at a predetermined scanning rate over the sample S.

At this time, when the inner frame 49 finely moves in the XY directions, the X-directional and Y-directional targets 81, 78 finely move respectively in the X and Y directions. The fine movement amounts in the X and Y directions are detected by the X-directional and Y-directional sensors 81, 78. Those detection results are inputted to the arithmetic operator section 83, to calculate an error in the XY-directional fine movement amounts of the cantilever 20. The calculation results are inputted to the control section 84. By thus correcting the XY-directional fine-movement amounts, linear operation in the X and Y directions is made without affected by the hysteresis and creep of the X-side and Y-side piezoelectric elements 61, 54.

In the scanning, in case the distance changes between the probe 21 and the sample S surface in accordance with the concavo-convex of the sample S, the probe 21 experiences a repellent or attractive force due to an atomic force or an intermittent contact force thus changing the vibration state of the cantilever 20 and hence the amplitude and phase thereof. The amplitude or phase change is to be detected as an output difference (referred to as a DIF signal) at from different two pairs of split surfaces of the photodetector 45. The DIF signal is inputted to the Z-voltage feedback circuit, not shown. The Z-voltage feedback circuit applies a voltage to the Z-side piezoelectric element 90 shown in FIG. 3 such that the amplitude and phase becomes equal according to the DIF signal.

The Z-side piezoelectric element 90 is repeatedly expanded and contracted at high speed by the voltage application. When the Z-side piezoelectric element 90 expands and contracts, the stage 16 moves at very high frequency in the Z direction through the extension 87, to move the sample S on the stage 16 in the Z direction. Due to this, in the scanning, the distance is kept constant at all times between the probe 21 and the sample S surface.

Meanwhile, when the stage 16 moves in the Z direction, the Z-directional fine-movement detector 108 detects a fine movement amount of the mechanism body 86. In accordance with the detection result, calculated is an error in the Z-directional fine movement amount of the stage 16. The calculation result is inputted to the control section 84, thus allowing for linear movement in the Z direction.

Incidentally, a fine movement amount may be detected by the Z-direction fine-movement detector 108 and displayed as height information due to the scanning probe microscope.

In this manner, a topological image of the sample S surface can be measured by making an image through inputting to the control section 84 the voltage applied to the X-side, Y-side and Z-side piezoelectric elements 61, 54, 90 or the signal of the X-directional, Y-directional and Z-directional sensors 81, 78, 108. Meanwhile, by measuring various ones of force and physical actions acting between the probe 21 and the sample S, measurement is available as to various pieces of physical-property information, such as of viscoelasticity, sample-S surface potential distribution, sample-S surface leak magnetic-field distribution and near-field optical images.

From the above, according to the scanning probe microscope 1 of the present embodiment, the Z-driver 85 is provided physically separately from the X-driver 52 and Y-driver 51 so that those can function independently. Accordingly, resonant frequency can be set higher at the Z-side piezoelectric element 90 than those at the X-side and Y-side piezoelectric elements 61, 54. Consequently, at a higher scanning rate of the probe 21, the stage 16 can be followed sufficiently thus increasing the whole scanning speed.

Because of individual functioning, the Z-side piezoelectric element 90 can be moved without being affected by the X-side and Y-side piezoelectric elements 61, 54. Accordingly, measurement accuracy can be improved while improving scanning speed.

Here, because many components, including the cantilever holder 22, the laser light source 44 and the photodiode 45, are provided on the cantilever 20 side in contrast to the stage 16 resting only the sample S thereon, the cantilever 20 side has a mechanism generally great in size and heavy in weight in the entire thereof. For this reason, by providing the cantilever 20 side with a probe fine-movement mechanism 26 not requiring a high scanning speed and the stage 16 side requiring higher responsibility with a stage fine-movement mechanism 27, scanning speed can be improved furthermore.

Meanwhile, because the probe fine-movement mechanism 26 has the laser light source 44 and photodetector 45 that serve as displacement detecting means, the displacement amount of the cantilever 20 can be positively measured while finely moving the cantilever 20.

Incidentally, the displacement detecting means is not limited to this scheme but the invention includes, say, a scheme that a resistor is provided on the cantilever 20 itself so that measurement can be made based on a resistance change caused by a deflection of the cantilever 20.

Because the probe-side through-hole 70 is provided in the probe fine-movement mechanism 26 so that illumination light can be passed through the probe-side through-hole 70, measurement can be made accurate without obstructing the travel of illumination light.

Furthermore, the probe fine-movement mechanism 26 can be made small in size and thin in the entire because formed flat by the outer and inner frames 48, 49. Accordingly, this makes it possible to arrange a condenser lens shorter in work distance but higher in NA, thus improving the resolution of the inverted microscope 8.

Meanwhile, XYZ-directional fine-movement amounts can be detected by the X-directional, Y-directional and Z-directional fine-movement detectors 74, 73, 108 so that the probe fine-movement mechanism 26 and the stage fine-movement mechanism 27 can be operated linearly. Accordingly, measurement can be made with higher accuracy.

Furthermore, the plurality of objective lenses 10 are provided through the revolver 9 so that the plurality of objective lenses 10 can be selectably arranged in the observation site K by rotating the revolver 9. Accordingly, a suitable magnification of objective lens 10 can be positioned with easiness and swiftness.

Meanwhile, the objective lens 10 can be placed in further proximity to the sample S. Measurement can be made accurately by the provision of an objective lens having higher NA.

Meanwhile, by setting the thickness dimension R of the extension 87 smaller than the thickness dimension M of the mechanism body 86, a space J is provided underneath the extension 87. The space J can be utilized effectively. In the embodiment, by arranging the objective lens 10 in the space J, the objective lens 10 can be changed in position with easiness and swiftness without hindering the rotation of the revolver 9. Accordingly, the inverted microscope 8 can be improved in operationality.

Furthermore, by cantilever-supporting the stage fine-movement mechanism 27 through the mechanism body 86, the space J can be secured more sufficiently by a simple structure.

Figure 5:
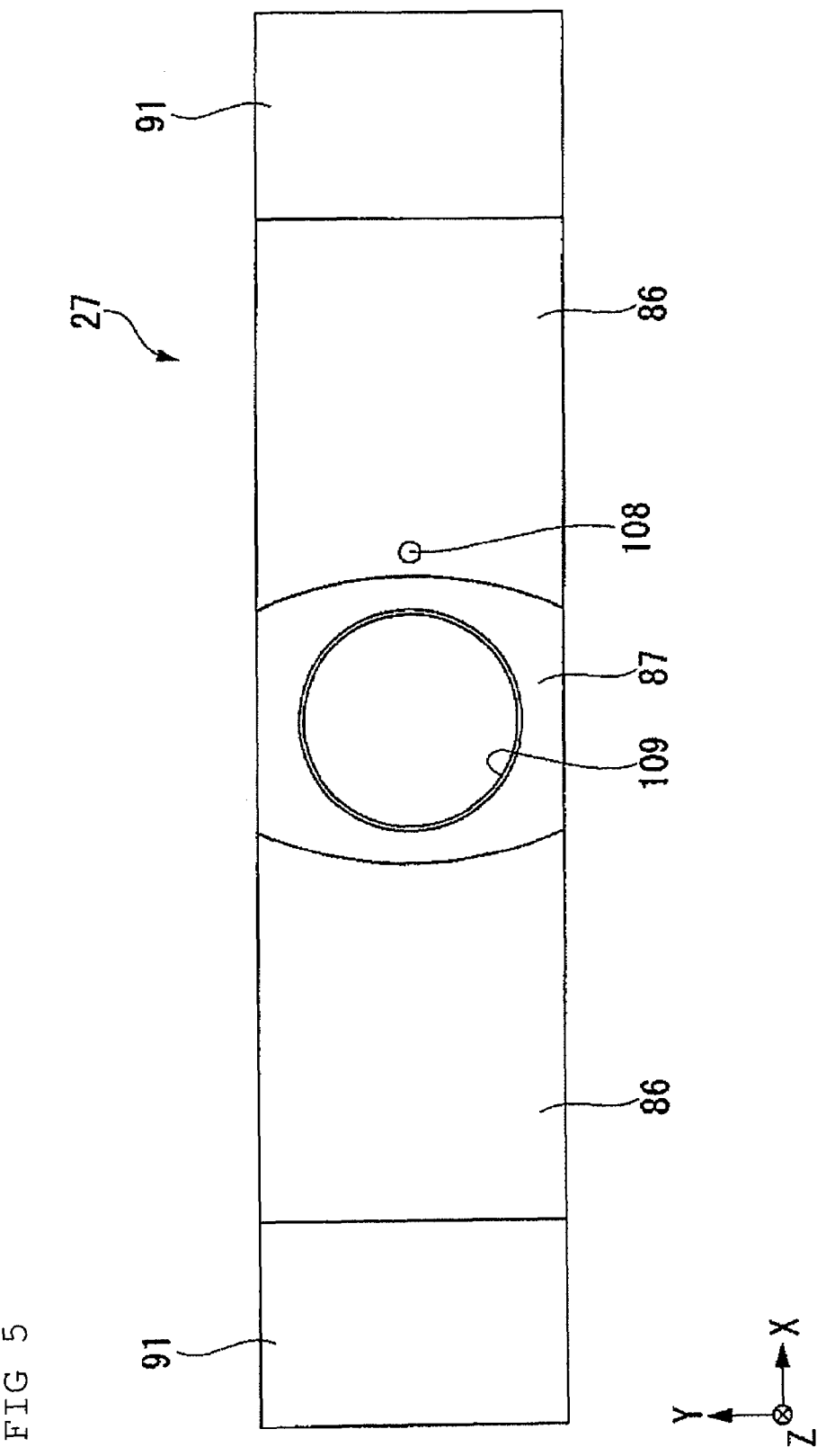
FIG. 5 is a magnified plan view showing a modification of the stage fine-movement mechanism shown in FIG. 1-a.
Figure 6:
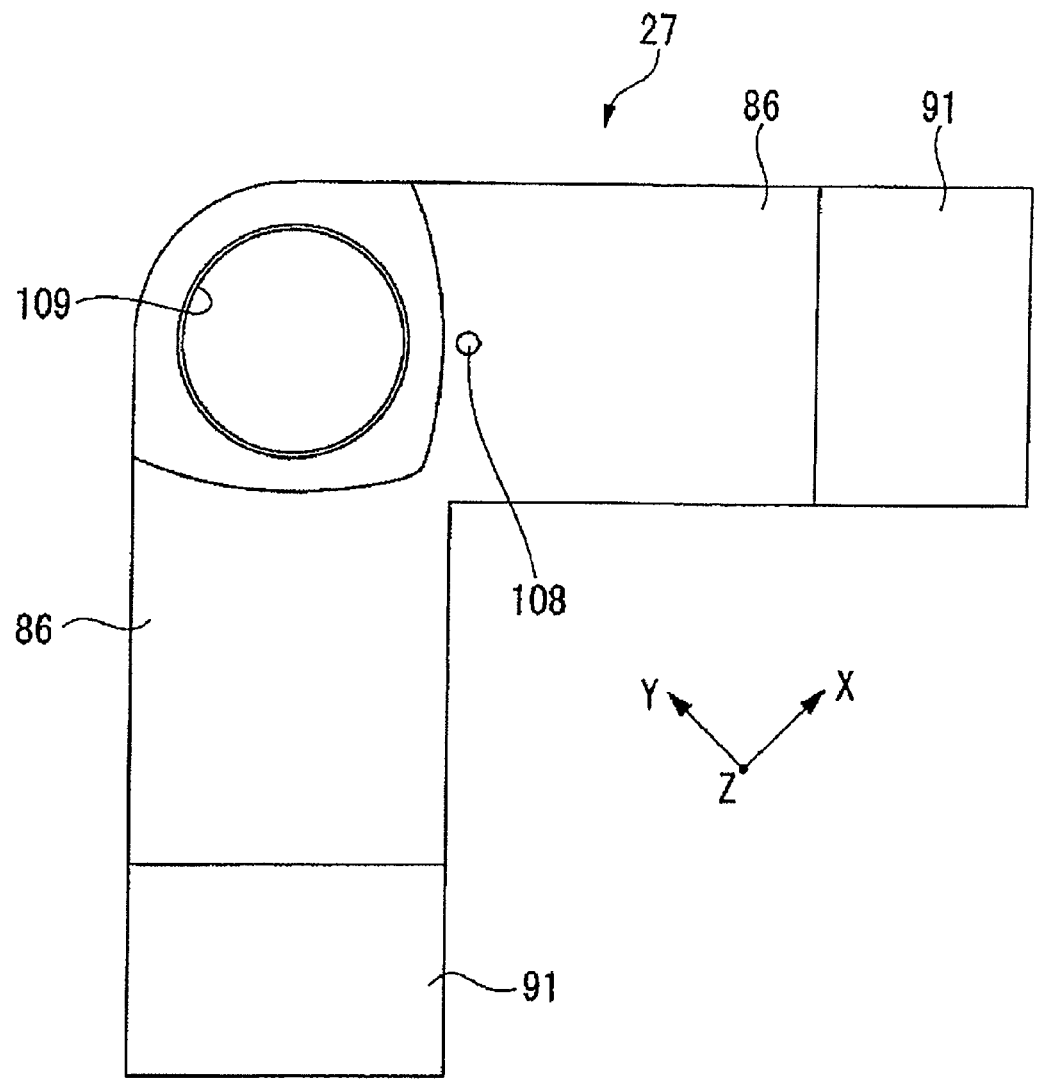
FIG. 6 is a magnified plan view showing another modification of the stage fine-movement mechanism shown in FIG. 1-a.

Incidentally, in the embodiment, although the stage fine-movement mechanism 27 was cantilever-supported, this is not limitative. For example, by arranging mechanism bodies 86 in the X direction and disposing the extension 87 between those as shown in FIG. 5, support may be at both ends by body mounts 91 provided at X-directional both ends. Alternatively, as shown in FIG. 6, by arranging a mechanism body 86 at 90 degrees in XY directions, support may be made at both ends by means of a body mount 91.

Furthermore, the stage fine-movement mechanism 27 may use a plurality of actuators as shown in FIG. 7. FIG. 7(*a*) is a plan view of the present stage fine-movement mechanism while FIG. 7(*b*) is a front view. The stage fine-movement mechanism 27 is arranged, in a triangular form in plan, with lamination-type piezoelectric elements 120 that are three actuators having the same shape and movement characteristics wherein each lamination-type piezoelectric element 120 has an end 120*b* fixed to a base 13 and a movable end 120*a* fixed, through a magnet 125, with a stage 121 on which a sample S is to be rested. The stage 121 is formed with a through-hole 122 while an objective lens 10 is arranged in a space 123 surrounded by the lamination-type piezoelectric elements 120. When voltage is applied to the lamination-type piezoelectric elements 120, the stage 121 moves vertically to a surface of the sample S.

In the stage movement mechanism 27 thus structured, because the stage 121 is supported by the three lamination-type piezoelectric elements 120, the stage 121 can be enhanced in its rigidity and moved at high speed in the Z direction. Meanwhile, the objective lens 10 can be arranged in the space 123 surrounded by the three lamination-type piezoelectric elements 120, and illumination light can be irradiated to the sample S through the space region. Meanwhile, the objective lens 10 can be exchanged by means of objective-lens arrangement change means (not shown) through 124, between adjacent ones of the lamination-type piezoelectric elements 120.

Embodiment 2

Now explanation is made on a second embodiment of the invention.

Figure 8:
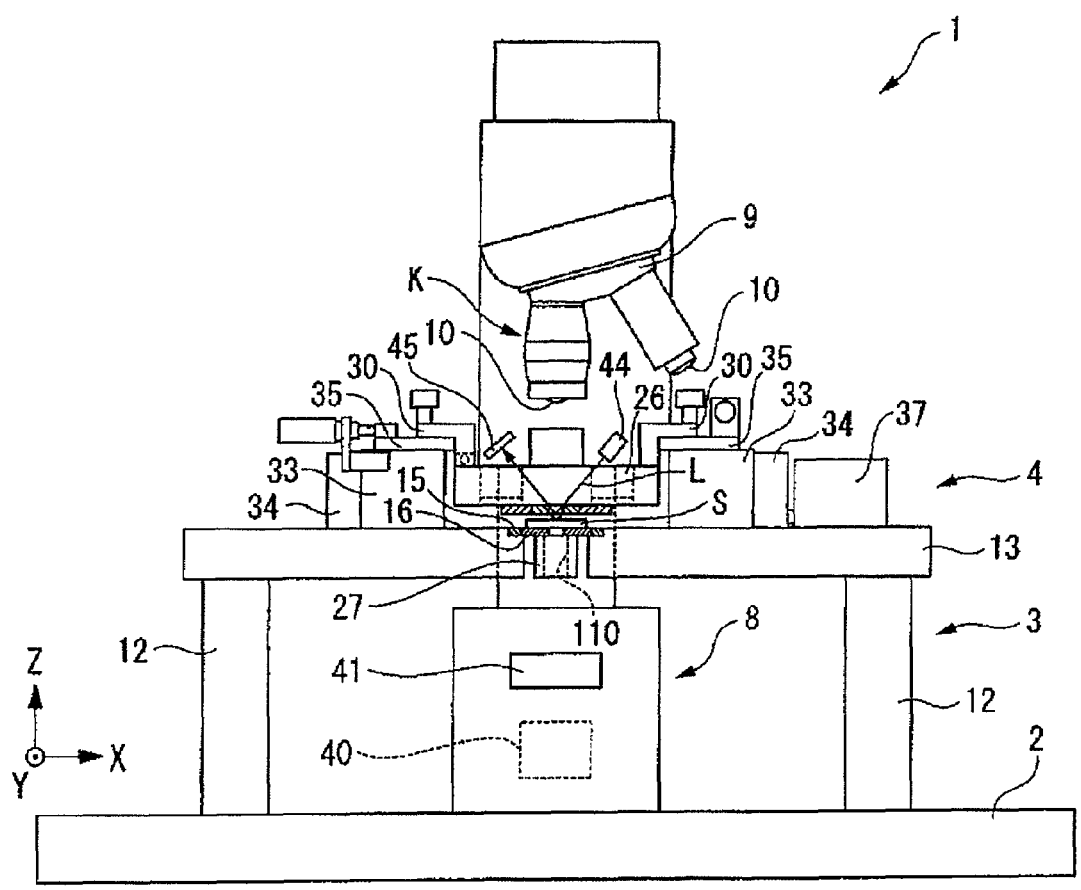
FIG. 8 is a front view showing a second embodiment of a scanning probe microscope according to the invention.

FIG. 8 shows a second embodiment of the invention.

In FIG. 8, the identical reference numeral is attached to the identical component to the element described in FIGS. 1 to 7, to omit the explanation thereof.

This embodiment is the same in basic structure as the first embodiment wherein difference lies in the following points.

Namely, the scanning probe microscope 1 in this embodiment is combined with an upright microscope. Namely, the upright microscope 8 is provided with a light source 40 and a condenser lens 41 at the upper end of the light source 40. Meanwhile, a stage fine-movement mechanism 27 is provided above the condenser lens 41. The stage fine-movement mechanism 27 is formed by a cylindrical Z-side piezoelectric element 90 wherein the Z-side piezoelectric element 90 is arranged directed in the Z direction. In the Z-side piezoelectric element 90, a bore (stage-side through-hole) 110 is formed directed in the Z direction. The illumination light from the light source 40 is passed through the bore 110.

Meanwhile, an objective lens 10 is provided in an observation site K above the probe fine-movement mechanism 26. Here, the observation site K refers to a site where the cantilever 20 or the sample S is observed from above of the probe fine-movement mechanism 26. The objective lens 10 is allowed to vertically move in the observation site K. When moved down, it can be inserted in the probe-side through-hole 70.

With this structure, the illumination light from the light source 40 passes through the bore 110 and transmits through the sample S. In case the objective lens 10 is moved down into the probe-side through-hole 70, the objective lens 10 goes toward the cantilever 20 or the sample S.

From the above, because the bore 110 is provided in the stage fine-movement mechanism 27 wherein illumination light is passed through the bore 110, measurement can be conducted with accuracy without obstructing the travel of illumination light.

Because the objective lens 10 can be inserted in the probe-side through-hole 70, the objective lens 10 can be put in further proximity to the cantilever 20 or the sample S. Measurement can be conducted accurately with the provision of an objective lens having high NA.

Incidentally, in the first and second embodiments, the X-side, Y-side and Z side piezoelectric elements 61, 54, 90 are lamination-type piezoelectric elements. However, this is not limitative but suitable change is possible. For example, those can be provided as stack-type piezoelectric elements or voice coils actuator, etc. can be used.

Meanwhile, cylindrical piezoelectric elements can be used in the probe fine-movement mechanism 26 or the stage fine-movement mechanism 27.

Meanwhile, observation was in the DFM. However, this is not limitative but application is possible for various modes of contact mode AFM. Furthermore, application is possible for a near-field optical microscope. Where applied for a near-field optical microscope, an objective lens having high NA can be used to improve the efficiency of gathering near-field optical signals.

Furthermore, in-liquid measurement was exemplified. However, this is not limitative but measurement may be in the air.

The technical scope of the invention is not limited to the foregoing embodiments but can be changed in various ways within the range not departing from the subject matter of the invention.

What is claimed is:

1. A scanning probe microscope having a stage to put a sample thereon and a probe to be placed in proximity to or in contact with a surface of the sample, comprising:
    an illuminator and an objective lens opposingly aligned with each other along an optical path;
    a probe fine-movement mechanism comprising a first driver responsive to a first voltage input to finely move the probe in X and Y directions with respect to the sample, wherein the probe fine-movement mechanism is formed with a light transmissive section through which the optical path runs and attached with the probe positioned in the optical path, such that the light transmissive section of the probe fine-movement mechanism, with light from the illuminator passing therethrough, enables a direct observation of the illuminated probe via the objective lens; and
    a stage fine-movement mechanism comprising a second driver responsive to a second voltage input to finely move the stage in a Z direction with respect to the sample, the stage fine-movement mechanism being arranged such that the stage fine-movement mechanism and the probe fine-movement mechanism are kinetically independent from each other, wherein
    the stage has a light transmissive section through which the optical path runs, and the sample is held by the stage in the optical path, such that the light transmissive section of the stage, with the light from the illuminator passing therethrough, enables a direct observation of the illuminated sample via the objective lens, and
    the stage fine-movement mechanism comprises a mechanism body configured to convert movements of the second driver in an X-Y plane to movements of the stage in the Z direction.

2. The scanning probe microscope according to claim 1, wherein the probe fine-movement mechanism comprises a probe displacement detector that detects a displacement of the probe.

3. The scanning probe microscope according to claim 2, wherein the probe displacement detector comprises a laser emitter which emits a laser towards the probe and a laser detector which detects the laser reflected by the probe.

4. The scanning probe microscope according to claim 1, further comprising a plurality of objective lenses including the objective lens which are selectively placed in the optical path for observation of the illuminated probe and sample.

5. The scanning probe microscope according to claim 1, further comprising at least one other of the mechanism body cooperative with the mechanism body to move the stage in the Z direction, wherein said at least one other of the mechanism body comprises another of the second driver and converts movements of said another of the second driver in an X-Y plane to movements of the stage in the Z direction.

6. The scanning probe microscope according to claim 5, wherein said at least one other of the mechanism body is arranged relative to the mechanism body so as to make an angle equal to or less than 180 degrees in an X-Y plane around the stage with respect to the mechanism body.

7. The scanning probe microscope according to claim 1, wherein the second driver comprises a cylindrical piezoelectric element.

8. The scanning probe microscope according to claim 1, wherein the first driver comprises a cylindrical piezoelectric element.

9. The scanning probe microscope according to claim 1, wherein the probe fine-movement mechanism comprises an inner frame and an outer frame being arranged coplanarly in an X-Y plane, and the first driver moves one of the inner and outer frames relative to the other in the X-Y plane.

10. The scanning probe microscope according to claim 1, further comprising a prove movement detector configured to detect at least one of a movement of the probe in the X-direction and a movement of the probe in the Y-direction.

11. The scanning probe microscope according to claim 10, further comprising a calculator configured to calculate an error in at least one of the detected movements of the probe in the X and Y directions from movements expected based on the first voltage input so as to linearly control at least one of the movements of the probe in the X and Y directions with respect to the first voltage input.

12. The scanning probe microscope according to claim 1, wherein the objective lens is placed closer to the sample than the probe along the optical path.

13. The scanning probe microscope according to claim 1, wherein the objective lens is placed closer to the probe than the sample along the optical path.

14. The scanning probe microscope according to claim 1, wherein the light transmissive sections of the probe fine-movement mechanism and the stage fine-movement mechanism are through-holes.

15. The scanning probe microscope according to claim 1, wherein the mechanism body is supported in a support direction in a cantilever fashion, and the stage is supported in the support direction by the mechanism body in a cantilever fashion, and further wherein a thickness of the stage in a direction perpendicular to the support direction is smaller than that of the mechanism body in the same direction.

16. The scanning probe microscope according to claim 1, wherein the mechanism body comprises a body mount and an upper and a lower walls which extend substantially in parallel via springs from the body mount and continue to the stage via other springs, and the upper and lower walls have a pair of support walls each extending from one of them towards the other, between which the second driver is supported, wherein movements of the second drivers cause rotations of the pair of support walls which are converted by the springs into movements of the stage in the Z direction.

17. The scanning probe microscope according to claim 1, further comprising stage movement detector configured to detect movements of the stage in the Z directions and a calculator configured to calculate an error in the detected movements of the stage from movements expected based on the second voltage input to linearly control the movements of the stage in the Z direction with respect to the second voltage input.

18. The scanning probe microscope according to claim 1, further comprising a Z rough-movement mechanism configured to move the probe fine-movement mechanism in the Z direction.

19. The scanning probe microscope according to claim 1, wherein the optical path is straight.

20. A scanning probe microscope having a stage for a sample to be placed thereon and a probe to be placed in proximity to or in contact with a surface of the sample, comprising:

an illuminator and an objective lens opposingly aligned with each other along an optical path;

a probe fine-movement mechanism comprising a first driver responsive to a first voltage input to finely move the probe in X and Y directions with respect to the sample, wherein the probe fine-movement mechanism is formed with a light transmissive section through which the optical path runs and attached with the probe positioned in the optical path, such that the light transmissive section of the probe fine-movement mechanism, with light from the illuminator passing therethrough, enables a direct observation of the illuminated probe via the objective lens; and a stage fine-movement mechanism comprising a plurality of second drivers arranged in a circle at regular angular intervals around the optical path which are responsive to a second voltage input to finely move the stage in a Z direction with respect to the sample, the stage fine-movement mechanism being arranged such that the stage fine-movement mechanism and the probe fine-movement mechanism are kinetically independent from each other, wherein the stage has a light transmissive section through which the optical path runs, and the sample is held by the stage in the optical path, such that the light transmissive section of the stage, with the light from the illuminator passing therethrough, enables a direct observation of the illuminated sample via the objective lens.

\* \* \* \* \*